(12) United States Patent
Guenter et al.

(10) Patent No.: US 7,347,801 B2
(45) Date of Patent: Mar. 25, 2008

(54) TOROIDAL TRANSMISSION

(75) Inventors: Ruehle Guenter, Loechgau (DE);
Walter Wolf, Marbach (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/588,842

(22) Filed: Oct. 27, 2006

(65) Prior Publication Data

US 2007/0149342 A1   Jun. 28, 2007

Related U.S. Application Data

(63) Continuation of application No. PCT/EP2005/003980, filed on Apr. 15, 2005.

(30) Foreign Application Priority Data

Apr. 30, 2004   (DE) ...................... 10 2004 022 356

(51) Int. Cl.
*F16H 37/02*   (2006.01)

(52) U.S. Cl. ...................... 475/216; 475/217

(58) Field of Classification Search ................ 475/214, 475/215, 216, 217

See application file for complete search history.

(56) References Cited

U.S. PATENT DOCUMENTS

| | | | |
|---|---|---|---|
| 3,299,744 A | | 1/1967 | Kraus |
| 4,569,251 A | | 2/1986 | Greenwood |
| 4,922,788 A | * | 5/1990 | Greenwood ................ 475/26 |
| 5,842,945 A | | 12/1998 | Inoue |
| 6,358,178 B1 | * | 3/2002 | Wittkopp .................... 475/207 |
| 6,726,590 B2 | * | 4/2004 | Henzler et al. ............. 475/216 |

FOREIGN PATENT DOCUMENTS

| | | |
|---|---|---|
| DE | 101 24 838 A1 | 5/2001 |
| DE | 1 012 51 560 A1 | 11/2002 |
| EP | 0 141 118 A1 | 5/1985 |
| EP | 0 306 272 A1 | 3/1989 |
| EP | 0 347 186 A2 | 12/1989 |
| EP | 0 743 218 B1 | 11/1996 |
| EP | 1 157 872 A2 | 11/2001 |
| EP | 1418 081 A2 | 5/2004 |
| WO | WO 2005073599 A1 * | 8/2005 |

OTHER PUBLICATIONS

English abstract of European patent application No. EP 1 418 081 A2 in the name of Bayerische Motoren Werk, published May 12, 2004.
English abstract of German patent application No. DE 101 24 838 A1 in the name of Spottl, Amim, published May 22, 2001.
English abstract of German patent application No. DE 1012 51 560 A1 in the name of Bayerische Motoren Werke AG, published Nov. 6, 2002.

* cited by examiner

*Primary Examiner*—Ha D. Ho
(74) *Attorney, Agent, or Firm*—Knobbe, Martens, Olson & Bear, LLP

(57) ABSTRACT

A toroidal transmission, especially for motor vehicles, comprising an input shaft which can be connected to an engine, a first toroidal variator and a second toroidal variator which are connected to the input shaft on the input side. A first output shaft can be connected to the output of the first toroidal variator, and a second output shaft can be connected to the output of the second toroidal variator. The toroidal transmission comprises a first power range shifter for the first toroidal variator and a second power range shifter for the second toroidal variator. The first power range shifter and the second power range shifter have a common clutch.

10 Claims, 3 Drawing Sheets

# TOROIDAL TRANSMISSION

CROSS-REFERENCE TO RELATED APPLICATIONS

This application is a continuation application of International patent application PCT/EP2005/003980 filed Apr. 15, 2005, which claims priority from German patent application DE 10 2004 022 356.

BACKGROUND OF THE INVENTION

The present invention relates to a toroidal transmission, especially for motor vehicles, comprising an input shaft which can be connected to an engine, a first toroidal variator and a second toroidal variator which are connected to the input shaft on the input side, a first output shaft which can be connected to the output of the first toroidal variator, and a second output shaft which can be connected to the output of the second toroidal variator.

Such a toroidal transmission is disclosed, for example, by EP 0 743 218 B1.

Toroidal transmissions have long been known in the art. They permit a continuously variable adjustment of the transmission ratio. Toroidal transmissions have hitherto been designed for standard vehicles having one powered axle.

A known concept for a toroidal transmission T (cf. FIG. 4) for motor vehicles comprises two toroidal variators V1, V2, which have a common hollow input shaft VE. The hollow input shaft VE is fixed to a countershaft VW, which is in turn connected by way of a fixed gear train to an output shaft E of an internal combustion engine.

The outputs VA1, VA2 of the toroidal variators V1, V2 are connected to one another and via an output shaft are connected to a sun gear of a planetary gear train P (summing gear set). A planet carrier of the planetary gear train is connected by way of a further fixed gear train to the countershaft. The internal gear (ring gear) of the planetary gear train is connected by way of a "low-range clutch" L to the output shaft of the toroidal transmission. The sun gear— and consequently the output shaft of the toroidal variators— is likewise connected by a "high-range clutch" H to the output shaft.

In this conventional gear train the toroidal transmission can be operated in two ranges, the "low" regime and the "high" regime. In the low regime the low-range clutch L is closed. In this case power is circulated in the transmission. The so-called "geared neutral" can thereby be achieved. In the high regime the high-range clutch H is closed. The drive power flows from the output shaft of the toroidal variators V1, V2 directly to the output A.

In the known toroidal transmission the two toroidal variators V1, V2 are arranged parallel to one another. In the low regime they are connected to the output shaft by way of the planetary gear train (summing gear set), in the high regime they are connected directly to the output shaft.

In standard vehicles the output shaft A of the toroidal transmission T is connected to the one powered axle.

Connecting the output shaft of the toroidal transmission to the input of a transfer case is also known in four-wheel drive vehicles. The transfer case transmits a certain percentage of the input power to a first powered axle (for example the front axle) and the remainder of the input power to a second powered axle (for example the rear axle).

Transfer cases, however, mean additional weight and take up additional overall space. Where the transfer case does not function purely mechanically, an additional control is needed for the transfer case.

The aforementioned EP 0 743 218 B1 discloses a toroidal transmission having two toroidal variators. The output of the one toroidal variator is connected to a differential, which transmits 50% of the input power to a front axle and 50% to a rear axle. The output of the other toroidal variator is connected directly to the rear axle and consequently transmits 100% of the torque to the rear axle. Accordingly in this toroidal transmission a torque distribution of 25%:75% is set up between the front axle and the rear axle in normal operation. However, no facility for power range shifting is provided. Nor can a "geared neutral" be achieved using the transmission.

In this known toroidal transmission the output of the one toroidal variator is assigned exclusively to the front axle, and the output of the other toroidal variator exclusively to the rear axle. The gear train structure described above with a low-range clutch and a high-range clutch is doubled in this mode, so that a power range shifting is feasible.

BRIEF SUMMARY OF THE INVENTION

Against this background the object of the present invention is to create an improved toroidal transmission having two output shafts, especially for all-wheel drive vehicles.

In the aforementioned toroidal transmission this object is achieved in that the toroidal transmission comprises a first power range shifting means for the first toroidal variator and a second power range shifting means for the second toroidal variator, and that the first power range shifting means and the second power range shifting means have a common clutch.

In the toroidal transmission according to the invention power range shifting means are provided for both toroidal variators or both output shafts. This allows a "geared neutral" to be set.

In addition, according to the invention a clutch of the first power range shifting means and a clutch of the second power range shifting means are combined in one common clutch.

The toroidal transmission according to the invention has overall advantages, since no additional transfer case is required for dividing the input power between two output shafts (powered axles). The result is a permanent all-wheel drive, the power distribution generally being up to 50% per powered axle. A longitudinal differential function can furthermore be achieved by suitable control measures.

The object is therefore achieved in full.

It is particularly advantageous if the common clutch is a low-range clutch, which is capable of connecting the input shaft to an input of a first summing gear set of the first power range shifting means and to an input of a second summing gear set of the second power range shifting means, or separating it therefrom.

The structural simplification that can be achieved through the incorporation of a common clutch is particularly advantageous when embodied in the low-range clutch.

At the same time it is particularly advantageous if an output of the first summing gear set is or can be connected to the first output shaft and if an output of the second summing gear set is or can be connected to the second output shaft.

It is advantageous overall if the first summing gear set and the second summing gear set each have a planetary gear train.

The summing gear sets can in each case easily be embodied by a planetary gear train.

It is particularly advantageous if the planetary gear trains are coupled together by a common element.

In this way the number of components can be further reduced.

At the same time it is particularly advantageous if the common element is a common planet carrier.

It is advantageous overall if the common element is an output element of the common clutch or if the common element is fixed to the output element of the common clutch.

It is furthermore advantageous if the outputs of the first toroidal variator and the second toroidal variator are connected to the sun gear of the first planetary gear train and the second planetary gear train respectively.

In this way the outputs of the toroidal variators can be very advantageously designed to couple to the input shaft in the "low regime" in order to achieve the "geared neutral" function.

It is furthermore advantageous if the internal gears of the planetary gear trains are or can be connected to the first output shaft and the second output shaft respectively.

The output of the first summing gear set is hereby connected to the first output shaft and the output of the second summing gear set to the second output shaft in an advantageous design.

It is furthermore advantageous if the first power range shifting means and the second power range shifting means each have a high-range clutch, which is capable of connecting the output of the first toroidal variator and of the second toroidal variator the associated output shaft, or separating it therefrom.

It is accordingly of particular advantage if the high-range clutches are not combined but are provided separately for each drivetrain.

It is advantageous overall if variator bypass means are provided, which serve to bypass the toroidal variators.

In this embodiment it is possible to set a third operating mode of the toroidal transmission, in which the toroidal variators are bypassed, so that the input power can be transmitted to the output shafts solely via toothing systems or closed clutches.

Finally it is advantageous if a locking clutch is provided between the outputs of the first toroidal variator and the second toroidal variator, or between the variator output shafts.

In this way it is possible to set a locking function, so that in an extreme case up to 100% of the input power can be transmitted to one of the two output shafts.

It will be obvious that the aforementioned features and those yet to be explained below can be used not only in the respective combination specified but also in other combination or alone, without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing.

DETAILED DESCRIPTION OF THE INVENTION

Figure 1:
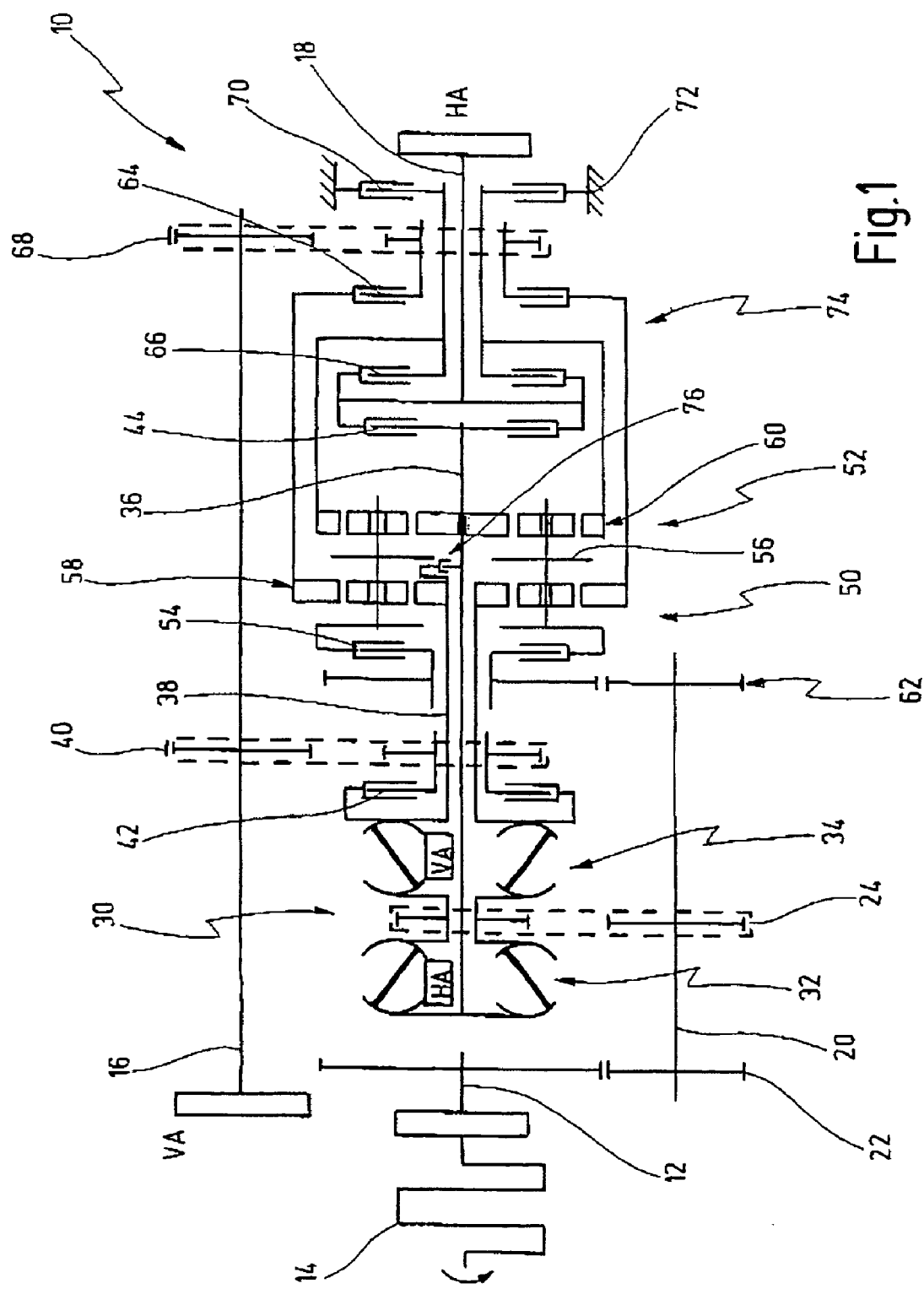
FIG. 1 shows a schematic gear train structure of a toroidal transmission according to a first embodiment of the invention.

In FIG. 1 a first embodiment of a toroidal transmission according to the invention is generally denoted by 10.

The toroidal transmission 10 is designed as a transmission for motor vehicles having an internal combustion engine.

The toroidal transmission 10 has an input shaft 12, which is connected to an output shaft of an internal combustion engine 14.

The toroidal transmission 10 furthermore has a first output shaft 16 and a second output shaft 18.

The first output shaft 16 is parallel to the input shaft 12, serves to drive a front axle VA of the motor vehicle and is usually connected to a front axle differential. The second output shaft 18 serves for connection to a powered rear axle HA of the motor vehicle and is usually connected to a rear axle differential.

The input shaft 12 of the toroidal transmission 10 is connected to a countershaft 20 by way of a fixed gear train 22. The countershaft 20 is connected to an input shaft of a variator arrangement 30 by way of a chain drive 24. A gear train or a belt drive may also be provided instead of the chain drive 24.

The variator arrangement 30 has a first toroidal variator 32 and a second toroidal variator 34. The variator input shaft is arranged between the toroidal variators 32, 34 and is connected to each of them by an input disk of the toroidal variators 32, 34.

The toroidal variators 32, 34 are in each case fully toroidal variators known in the art. The toroidal variators 32, 34 each have multiple (typically three) circumferentially distributed rollers, which are adjustable within the respective toroidal space.

The output disk of the first toroidal variator 32 is connected to a first variator output 36 in the form of a shaft, which is aligned coaxially with the input shaft 12. The output disk of the second toroidal variator 34 is connected to a second variator output 38, which takes the form of a hollow shaft. The shaft 36 and the hollow shaft 38 extend towards the second output shaft 18, which is arranged coaxially with the input shaft 12.

The hollow shaft 38 is connected by way of a first high-range clutch 42 to a further hollow shaft section (not further denoted). The further hollow shaft section is connected by way of a second chain drive 40 to the first output shaft 16.

The shaft 36 can be connected by way of a second high-range clutch 44 to the second output shaft 18.

The first high-range clutch 42 is part of first power range shifting means 50. The second high-range clutch 44 is part of second power range shifting means 52.

The first power range shifting means 50 and the second power range shifting means 52 have a common low-range clutch 54. The common low-range clutch 54 is connected on the output side to a common planet carrier 56 of a first planetary gear train 58 and a second planetary gear train 60.

On the input side the common low-range clutch 54 is connected to a further hollow shaft section (not denoted further), which is connected by way of a second fixed gear train 62 to the countershaft 20.

The axial order of the hitherto specified structural members of the toroidal transmission 10 in an axial direction is as follows: fixed gear train 22, first toroidal variator 32, chain drive 24, second toroidal variator 34, first high-range clutch 42, second chain drive 40, second fixed gear train 62, common low-range clutch 54, first planetary gear train 58, second planetary gear train 60, second high-range clutch 44.

The first planetary gear train 58 has a sun gear, which is connected to the hollow shaft 38. The second planetary gear train 60 has a sun gear, which is connected to the shaft 36.

In a simplified embodiment (not shown) of the toroidal transmission according to the invention the internal gear of the planetary gear train 58 is connected to the first output shaft 16, and the internal gear of the second planetary gear train 60 is connected to the second output shaft 18.

In the present embodiment of the toroidal transmission 10 according to the invention, however, measures have been taken to set up a further operating mode, as will be explained below.

Namely, the internal gear of the first planetary gear train 58 is not locked to the first output shaft 16 but to an input element of a front axle clutch 64. The output element of the front axle clutch 64 is connected to a further hollow shaft section (not denoted further). The further hollow shaft section is connected by way of a third chain drive 68 to the first output shaft 16.

A rear axle clutch 66 is furthermore provided. An input element of the rear axle clutch 66 is connected to the internal gear of the second planetary gear train 60. An output element of the rear axle clutch 66 is connected to the second output shaft 18.

Finally a bypass brake 70 is provided. A first element of the bypass brake 70 is fixed to a housing 72 of the toroidal transmission 10. A second element of the bypass brake 70 is connected to the input element of the rear axle clutch 66 and to the internal gear of the second planetary gear train 60, respectively.

The rear axle clutch 66 and the bypass brake 70 form bypass means 74, serving to set up an operating mode in which the input power of the toroidal transmission 10 is made to bypass the variator arrangement 30 and is transmitted to the output shaft 18 solely via toothing systems or closed clutches. In addition, as in the state of the art, a "low-regime" operating mode and a "high-regime" operating mode are feasible. The three different operating modes can be set by the various clutches and brakes of the toroidal transmission 10 as follows:

56 of the two planetary gear trains 58, 60. The aggregate power is then transmitted via the internal gear of the first planetary gear train 58 and via the front axle clutch 64 and the chain drive 68 to the first input shaft 16 (that is to say to the front axle VA).

For the rear axle HA the power of the first toroidal variator 32 is transmitted into the second planetary gear train 60. A second power branch again comes via the common planet arm (planet carrier 56) of the two planetary gear trains 58, 60. The power is then transmitted to the second output shaft 18 (that is to say to the rear axle HA) via the internal gear of the second planetary gear train 60 and the rear axle clutch 66.

In the high regime the common low-range clutch 54 is opened. The power of the second toroidal variator 34 is transmitted via the first high-range clutch 42 and the second chain drive 40 to the first output shaft 16 (that is to say to the front axle VA). The power of the first toroidal variator 32 is transmitted via the second high-range clutch 44 directly to the second output shaft 18 (that is to say to the rear axle HA).

In the variator bypass operating mode the power does not flow via the variator arrangement 30 but is transmitted to the output shaft 18 via the toothing stages or closed friction clutches. The power in this case flows via the first fixed gear train 22, the countershaft 20, the second fixed gear train 62, and the common low-range clutch 54 into the common planetary gear carrier 56. Since the internal gear of the second planetary gear train 60 is fixed to the housing 72 by the bypass brake 70, the power is led via the sun gear of the second planetary gear train 60 and the closed second high-range clutch 44 to the second output shaft 18. That is to say in this operating mode only the rear axle HA is powered.

The efficiency of the toroidal transmission 10 can be significantly increased by the bypass means 74.

Reference numeral 76 further denotes an optional locking clutch, which is connected between the output to the front axle VA and the output to the rear axle HA. In this case the locking clutch 76 is provided between the output shafts 36, 38 of the toroidal variators. This locking clutch 76 serves to achieve a differential locking action, and 100% of the drive power can theoretically be transmitted to one of the two axles VA, HA.

Figure 2:
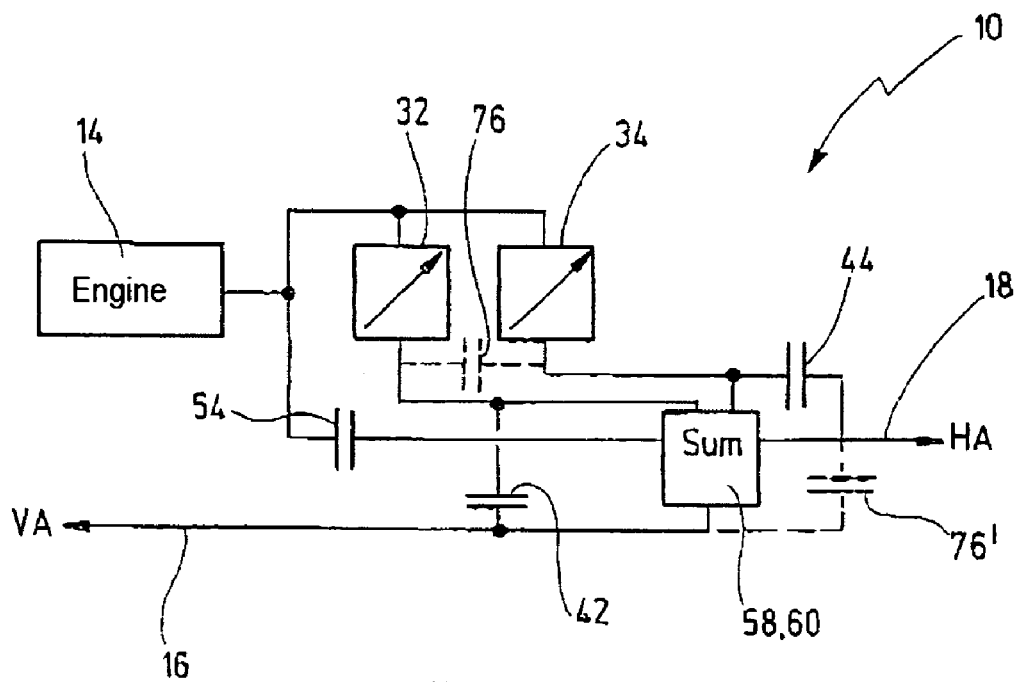
FIG. 2 shows a schematic representation of the possible speed/torque path in the toroidal transmission according in FIG. 1, but without variator lockup.

FIG. 2 shows the power flow of the toroidal transmission 10 in schematic form. It will be seen that the engine is coupled in parallel to the two toroidal variators 32, 34.

The outputs of the toroidal variators 32, 34 can each be directly connected to the associated output shafts 16 and 18

|  | Low-range clutch 54 | High-range clutch 44 | High-range clutch 42 | Rear axle clutch 66 | Front axle clutch 64 | Bypass brake 70 |
|---|---|---|---|---|---|---|
| Low regime | X |  |  | X | X |  |
| High regime |  | X | X |  |  |  |
| Variator bypass | X | X |  |  |  | X |

In the low regime the power flows from the second toroidal variator 34 into the first planetary gear train 58. The second power branch comes via the common planet carrier respectively by way of high-range clutches 42, 44. Furthermore, the outputs of the toroidal variators 32, 34 are combined in a summing gear set 58, 60. A further input of the summing gear set 58, 60 is connected by the common low-range clutch 54 directly to the input of the toroidal transmission 10.

Possible arrangements of the optional locking clutch are indicated by 76 and 76'.

Figure 3:
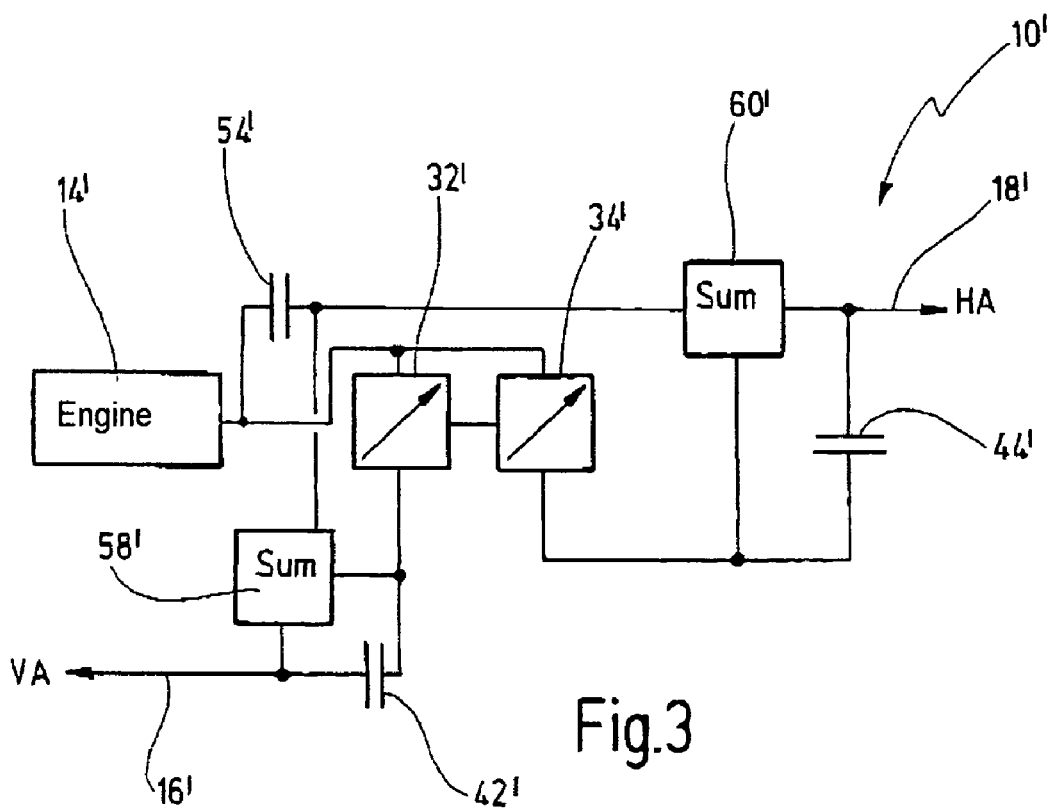
FIG. 3 shows a representation, corresponding to FIG. 2, of an alternative embodiment of a toroidal transmission according to the invention.
Figure 4:
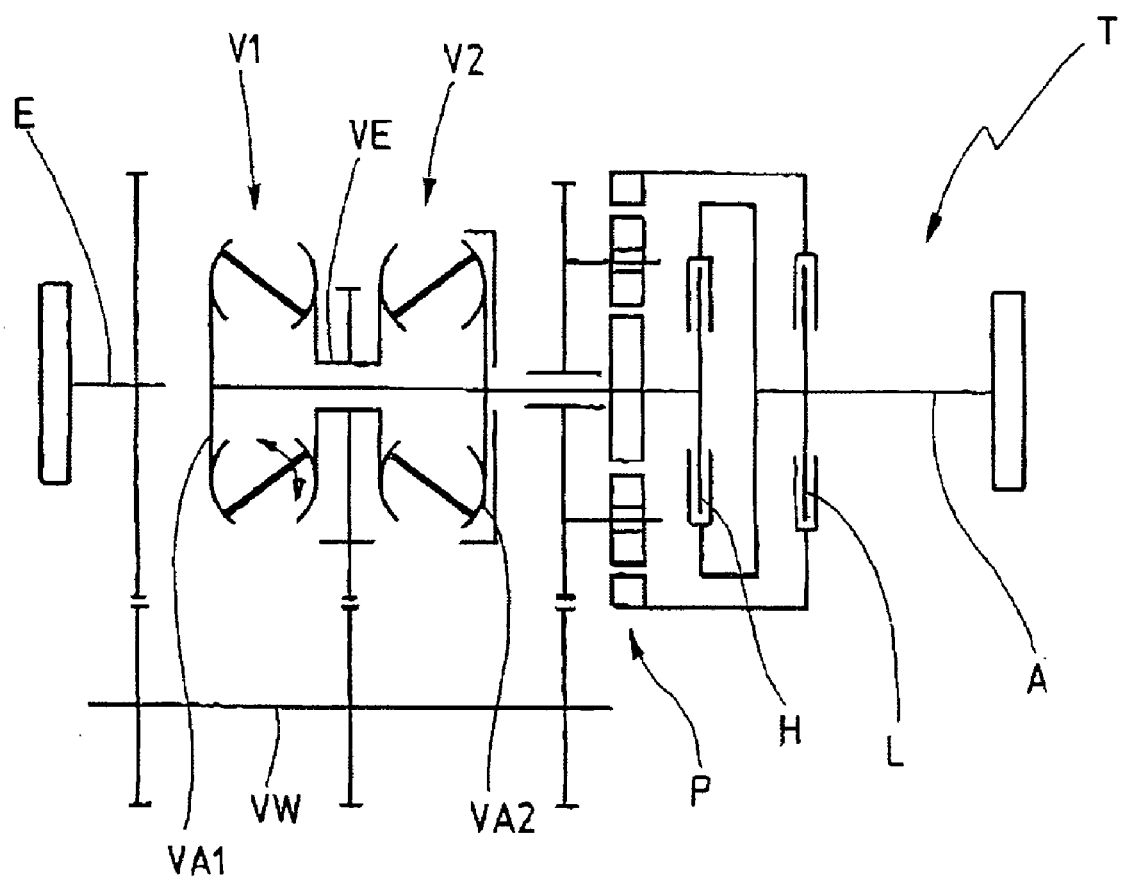
FIG. 4 shows a toroidal transmission in the state of the art.

FIG. 3 shows a further embodiment of a toroidal transmission 10' according to the invention represented in the same way as in FIG. 2.

In the case of the toroidal transmission 10' precisely the same functions can be obtained as in the toroidal transmission 10 in FIGS. 1 and 2. The general structure of the transmission is furthermore similar. The same or similar elements are consequently provided with the same reference numerals, but to distinguish them these are marked with an apostrophe.

In contrast to the toroidal transmission 10, the toroidal transmission 10' has two separate summing gear sets 58', 60'. In other words the summing gear sets 58', 60' are not connected by a common element, such as the common planet carrier 56 of the planetary gear trains 58, 60 of the toroidal transmission 10. Accordingly an output element of the common low-range clutch 54 is connected on the one hand to an input of the summing gear set 58' and on the other to an input of the summing gear set 60'.

The design cost of the toroidal transmission 10' is generally somewhat higher than that for the toroidal transmission 10. However, the separation of the summing gear sets 58', 60' permits a more flexible arrangement within the housing.

The invention claimed is:

1. A toroidal transmission, comprising an input shaft which can be connected to an engine, a first toroidal variator and a second toroidal variator which are connected to the input shaft on the input side, a first output shaft which can be connected to the output of the first toroidal variator, and a second output shaft which can be connected to the output of the second toroidal variator, wherein the toroidal transmission comprises a first power range shifting means for the first toroidal variator and a second power range shifting means for the second toroidal variator, wherein the first power range shifting means and the second power range shifting means have a common clutch, and the common clutch is a low-range clutch, which is capable of connecting the input shaft to an input of a first summing gear set of the first power range shifting means and to an input of a second summing gear set of the second power range shifting means, or separating it therefrom.

2. The toroidal transmission as claimed in claim 1, wherein an output of the first summing gear set is or can be connected to the first output shaft and wherein an output of the second summing gear set is or can be connected to the second output shaft.

3. The toroidal transmission as claimed in claim 1, wherein the first summing gear set and the second summing gear set each have a planetary gear train.

4. The toroidal transmission as claimed in claim 3 wherein the planetary gear trains are coupled together by a common element.

5. The toroidal transmission as claimed in claim 4, wherein the common element is a common planet carrier.

6. The toroidal transmission as claimed in claim 3, wherein the outputs of the first toroidal variator and the second toroidal variator are connected to the sun gears of the first planetary gear train and the second planetary gear train, respectively.

7. The toroidal transmission as claimed in claim 3, wherein the internal gears of the planetary gear trains are or can be connected to the first output shaft and the second output shaft, respectively.

8. A toroidal transmission, comprising an input shaft which can be connected to an engine, a first toroidal variator and a second toroidal variator which are connected to the input shaft on the input side, a first output shaft which can be connected to the output of the first toroidal variator, and a second output shaft which can be connected to the output of the second toroidal variator, wherein the toroidal transmission comprises a first power range shifting means for the first toroidal variator and a second power range shifting means for the second toroidal variator, wherein the first power range shifting means and the second power range shifting means have a common clutch, wherein the first power range shifting means and the second power range shifting means each have a high-range clutch, which is capable of connecting the output of the first toroidal variator and the second toroidal variator respectively to the associated output shaft or separating it therefrom.

9. The toroidal transmission as claimed in claim 1, wherein variator bypass means are provided, which bypass the toroidal variators.

10. A toroidal transmission, comprising an input shaft which can be connected to an engine, a first toroidal variator and a second toroidal variator which are connected to the input shaft on the input side, a first output shaft which can be connected to the output of the first toroidal variator, and a second output shaft which can be connected to the output of the second toroidal variator, wherein the toroidal transmission comprises a first power range shifting means for the first toroidal variator and a second power range shifting means for the second toroidal variator, wherein the first power range shifting means and the second power range shifting means have a common clutch, wherein a locking clutch is provided between the outputs of the first toroidal variator and the second toroidal variator.

* * * * *